United States Patent
Gupta (10) Patent No.: US 10,771,482 B1
(45) Date of Patent: Sep. 8, 2020

(54) SYSTEMS AND METHODS FOR DETECTING GEOLOCATION-AWARE MALWARE

(71) Applicant: CA, INC., San Jose, CA (US)

(72) Inventor: Prashant Gupta, Gloucestershire (GB)

(73) Assignee: CA, Inc., San Jose, CA (US)

( * ) Notice: Subject to any disclaimer, the term of this patent is extended or adjusted under 35 U.S.C. 154(b) by 142 days.

(21) Appl. No.: 15/811,713

(22) Filed: Nov. 14, 2017

(51) Int. Cl.
*H04L 29/06* (2006.01)

(52) U.S. Cl.
CPC ........ *H04L 63/1416* (2013.01); *H04L 63/145* (2013.01)

(58) Field of Classification Search
CPC . H04L 63/0227; H04L 63/0245; H04L 63/14; H04L 63/1408; H04L 63/1416; H04L 63/1441; H04L 63/145; H04L 63/1466; H04L 63/1491; G06F 21/121; G06F 21/53; G06F 21/56; G06F 21/566; G06F 2221/2111; G06F 2221/2149
See application file for complete search history.

(56) References Cited

U.S. PATENT DOCUMENTS

| | | | | |
|---|---|---|---|---|
| 6,728,779 B1* | 4/2004 | Griffin | ..................... | H04L 45/02 370/469 |
| 6,981,158 B1* | 12/2005 | Sanchez | .............. | H04L 63/1416 714/E11.207 |
| 9,088,601 B2* | 7/2015 | Friedrichs | ........... | H04L 63/1416 |
| 9,749,336 B1* | 8/2017 | Zhang | ..................... | H04L 63/14 |
| 2003/0099203 A1* | 5/2003 | Rajan | ..................... | H04L 41/12 370/238 |
| 2004/0085906 A1* | 5/2004 | Ohtani | .................. | G06F 21/552 370/248 |
| 2005/0262233 A1* | 11/2005 | Alon | .................... | H04L 41/0622 709/223 |
| 2009/0019537 A1* | 1/2009 | Stavrou | ............... | H04L 63/1416 726/13 |
| 2009/0049549 A1* | 2/2009 | Park | ........................ | G06F 21/55 726/22 |
| 2012/0278886 A1* | 11/2012 | Luna | ..................... | G06F 21/552 726/22 |
| 2013/0298243 A1* | 11/2013 | Kumar | .................... | G06F 21/52 726/25 |

(Continued)

OTHER PUBLICATIONS

Simmons, Robert; "BB2016 Paper: Open Source Malware Lab"; https://www.virusbulletin.com/virusbulletin/2017/01/vb2016-paper-open-source-malware-lab/; retrieved Nov. 3, 2017.

*Primary Examiner* — Eric W Shepperd
(74) *Attorney, Agent, or Firm* — FisherBroyles, LLP (57) ABSTRACT

The disclosed computer-implemented method for detecting geolocation-aware malware may include (1) receiving, by a computing device, trajectory information for network traffic carrying geolocation-aware malware, (2) identifying, from the trajectory information, a target geolocation characteristic required to activate the geolocation-aware malware, (3) establishing, on an image of a user machine, an execution environment having the target geolocation characteristic, (4) running, on the image of the user machine, the geolocation-aware malware, and (5) analyzing functioning of the geolocation-aware malware to identify malicious activity by the geolocation-aware malware. Various other methods, systems, and computer-readable media are also disclosed.

21 Claims, 5 Drawing Sheets

(56) References Cited

U.S. PATENT DOCUMENTS

| | | | | |
|---|---|---|---|---|
| 2013/0305044 | A1* | 11/2013 | Gutt | H04L 45/00 |
| | | | | 713/160 |
| 2013/0305369 | A1* | 11/2013 | Karta | H04L 63/1416 |
| | | | | 726/23 |
| 2014/0137249 | A1* | 5/2014 | Johnson | G06F 21/564 |
| | | | | 726/23 |
| 2014/0140203 | A1* | 5/2014 | Lynar | H04L 29/14 |
| | | | | 370/225 |
| 2014/0283066 | A1* | 9/2014 | Teddy | G06F 21/56 |
| | | | | 726/23 |
| 2014/0289853 | A1* | 9/2014 | Teddy | H04L 63/1416 |
| | | | | 726/23 |
| 2015/0067853 | A1* | 3/2015 | Amrutkar | H04L 63/14 |
| | | | | 726/23 |
| 2015/0074810 | A1* | 3/2015 | Saher | G06F 16/951 |
| | | | | 726/23 |
| 2015/0261955 | A1* | 9/2015 | Huang | G06F 21/562 |
| | | | | 726/23 |
| 2015/0288708 | A1* | 10/2015 | Lietz | H04L 63/1408 |
| | | | | 726/23 |
| 2015/0326589 | A1* | 11/2015 | Smith | H04L 63/02 |
| | | | | 726/1 |
| 2017/0134405 | A1* | 5/2017 | Ahmadzadeh | H04L 63/1416 |
| 2018/0077195 | A1* | 3/2018 | Gathala | H04L 63/1433 |

* cited by examiner

SYSTEMS AND METHODS FOR DETECTING GEOLOCATION-AWARE MALWARE

BACKGROUND

Malware is increasingly able to target users in specific geographic locations, while not targeting users in other geographic locations. For example, malware may identify locations where it runs by analyzing the results of geo-IP requests and local artifact requests. When the malware identifies its current location as a target location, the malware may execute a malicious payload. For example, a Brazilian Banking Trojan may be configured to execute a malicious payload when running on a user machine in a bank in Brazil. However, the Brazilian Banking Trojan will not execute the malicious payload when running on a user machine in Chile and will not appear as malware on the user machine in Chile.

The instant disclosure, therefore, identifies and addresses a need for systems and methods for detecting geolocation-aware malware.

SUMMARY

As will be described in greater detail below, the instant disclosure describes various systems and methods for detecting geolocation-aware malware. In one example, a method for detecting geolocation-aware malware may include (1) receiving, by a computing device, trajectory information for network traffic carrying geolocation-aware malware, (2) identifying, from the trajectory information, a target geolocation characteristic required to activate the geolocation-aware malware, (3) establishing, on an image of a user machine, an execution environment having the target geolocation characteristic, (4) running, on the image of the user machine, the geolocation-aware malware, and (5) analyzing functioning of the geolocation-aware malware to identify malicious activity by the geolocation-aware malware.

In some embodiments, the trajectory information is received from an advanced threat protection platform. In some examples, the trajectory information may include at least one of (1) a location of an advanced threat protection platform from which the trajectory information is received, (2) a source of the network traffic, and (3) a destination of the network traffic. In further examples, the method may include (1) receiving, from an advanced threat protection platform, information describing at least one of location-specific hardware of a target of the network traffic and location-specific software of the target of the network traffic, and (2) identifying the target geolocation characteristic from the information describing at least one of the location-specific hardware of the target of the network traffic, and the location-specific software of the target of the network traffic. In some embodiments, the method may include (1) receiving, from an advanced threat protection platform, information describing at least one of a language setting of an operating system of a target machine, a keyboard language of the target machine, and a time zone of the target machine, and (2) identifying the target geolocation characteristic from the information describing at least one of the language setting of the operating system of the target machine, the keyboard language of the target machine, and the time zone of the target machine.

Moreover, running the geolocation-aware malware may further include (1) receiving a request, from the geolocation-aware malware, for geolocation-related information about a target machine, and (2) providing, to the geolocation-aware malware, a falsified network response indicating the geolocation-related information about the target machine. In some embodiments, running the geolocation-aware malware further may include (1) receiving a request, from the geolocation-aware malware, for an application program interface (API) response indicating geolocation-related information, and (2) providing, to the geolocation-aware malware, a falsified API response indicating the geolocation-related information.

In some embodiments, the method may include determining, using the identified malicious activity as a basis, at least one of a signature of the geolocation-aware malware, a verdict that the geolocation-aware malware is not safe to run on a target machine, and a reputation of the geolocation-aware malware. In some examples, the method may include performing at least one security action in response to identifying malicious activity by the geolocation-aware malware.

In some embodiments, a system for detecting geolocation-aware malware may include several modules stored in a memory device, including (1) a receiving module, stored in a memory device, that receives trajectory information for network traffic carrying the geolocation-aware malware, (2) an identifying module, stored in the memory device, that identifies, from the trajectory information, a target geolocation characteristic required to activate the geolocation-aware malware, (3) an establishing module, stored in the memory device, that establishes, on an image of a user machine, an execution environment having the target geolocation characteristic, (4) a running module, stored in the memory device, that runs the geolocation-aware malware on the image of the user machine, and (5) an analyzing module, stored in the memory device, that analyzes functioning of the geolocation-aware malware to identify malicious activity by the geolocation-aware malware.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive trajectory information for network traffic carrying geolocation-aware malware, (2) identify, from the trajectory information, a target geolocation characteristic required to activate the geolocation-aware malware, (3) establish, on an image of a user machine, an execution environment having the target geolocation characteristic, (4) run, on the image of the user machine, the geolocation-aware malware, and (5) analyze functioning of the geolocation-aware malware to identify malicious activity by the geolocation-aware malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting geolocation-aware malware. As will be explained in greater detail below, in some examples the systems described herein may enable running and analyzing geolocation-aware malware in a controlled environment that bypasses geo-aware anti-analysis features implemented within geolocation-aware malware. In examples, the provided techniques may use trajectory information to infer and/or identify target geolocation characteristics required to activate geolocation-aware malware. Trajectory information may include information describing paths taken and/or intended to be taken by network traffic carrying geolocation-aware malware. Target geolocation characteristics may also include information describing geolocation-specific software and/or hardware such as keyboard languages, time zones, and/or operating system languages. Geolocation-aware malware may then run on a user machine image that has target geolocation characteristics in order to trigger malicious activity by geolocation-aware malware in controlled environments in which geolocation-aware malware and malicious activity may be identified, manipulated, monitored, and analyzed. Using target geolocation characteristics in controlled environments may enable identifying geolocation-aware malware that otherwise would not be identified.

By doing so, systems and methods described herein may improve functioning of a computing device and/or provide targeted protection against malware by adapting Advanced Threat Protection (ATP) platforms to location-specific threats, and thus improve fields of malware protection in general, by providing a method for automatically detecting geolocation-aware malware. Further, systems and methods described herein may beneficially provide malware protection having a lower cost than other techniques. In some examples, systems and methods described herein may beneficially provide malware protection that does not interfere with implementing other malware protection techniques. Thus, disclosed systems and methods may provide asset protection for common targets of malware, such as hospitals, shipping companies, financial companies, governments, etc. by reducing recovery times needed to resume operations. In addition, the systems and methods described herein may improve a state of security of target computing devices.

Figure 1:
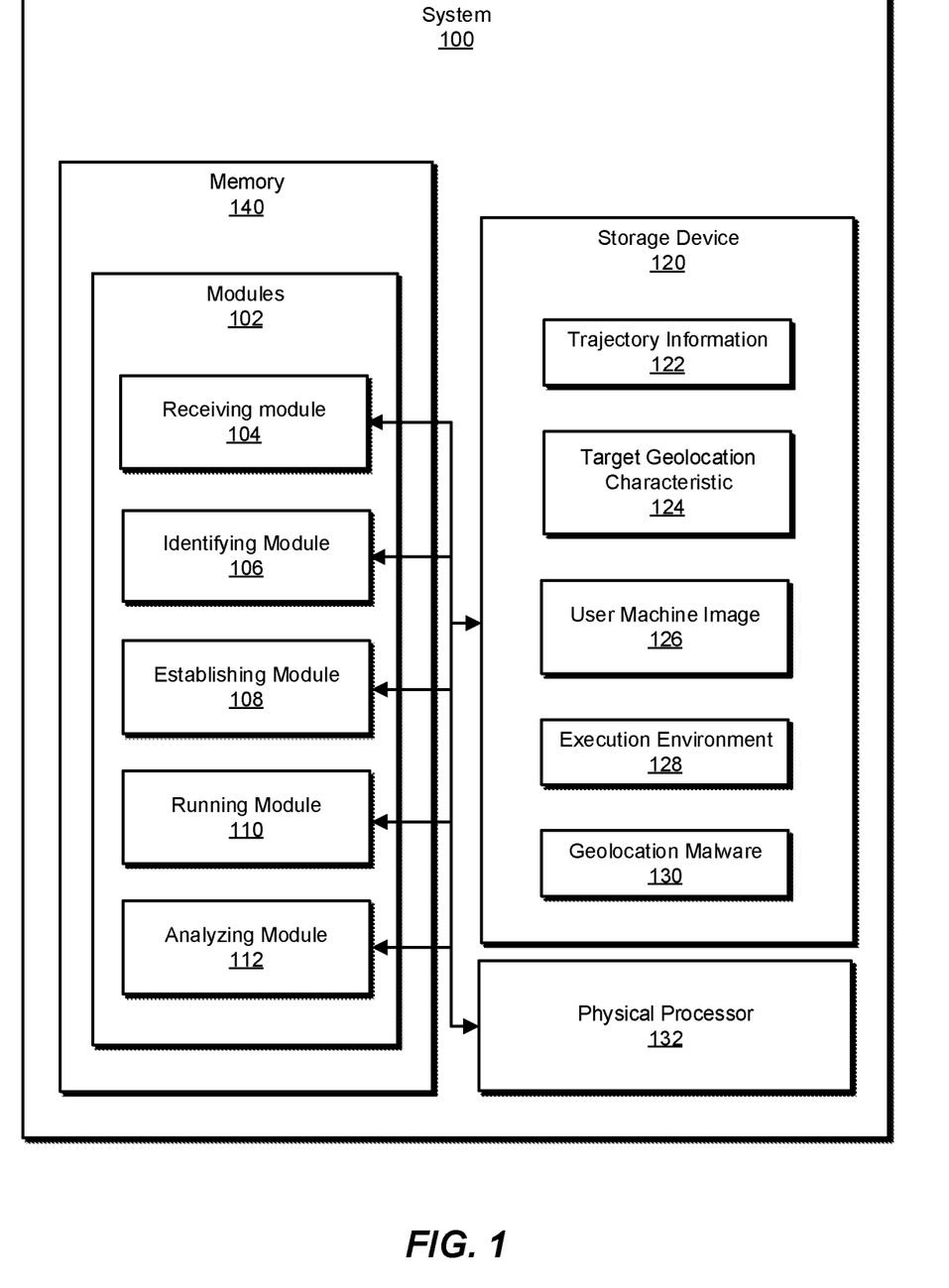
FIG. 1 is a block diagram of an example system for detecting geolocation-aware malware.
Figure 2:
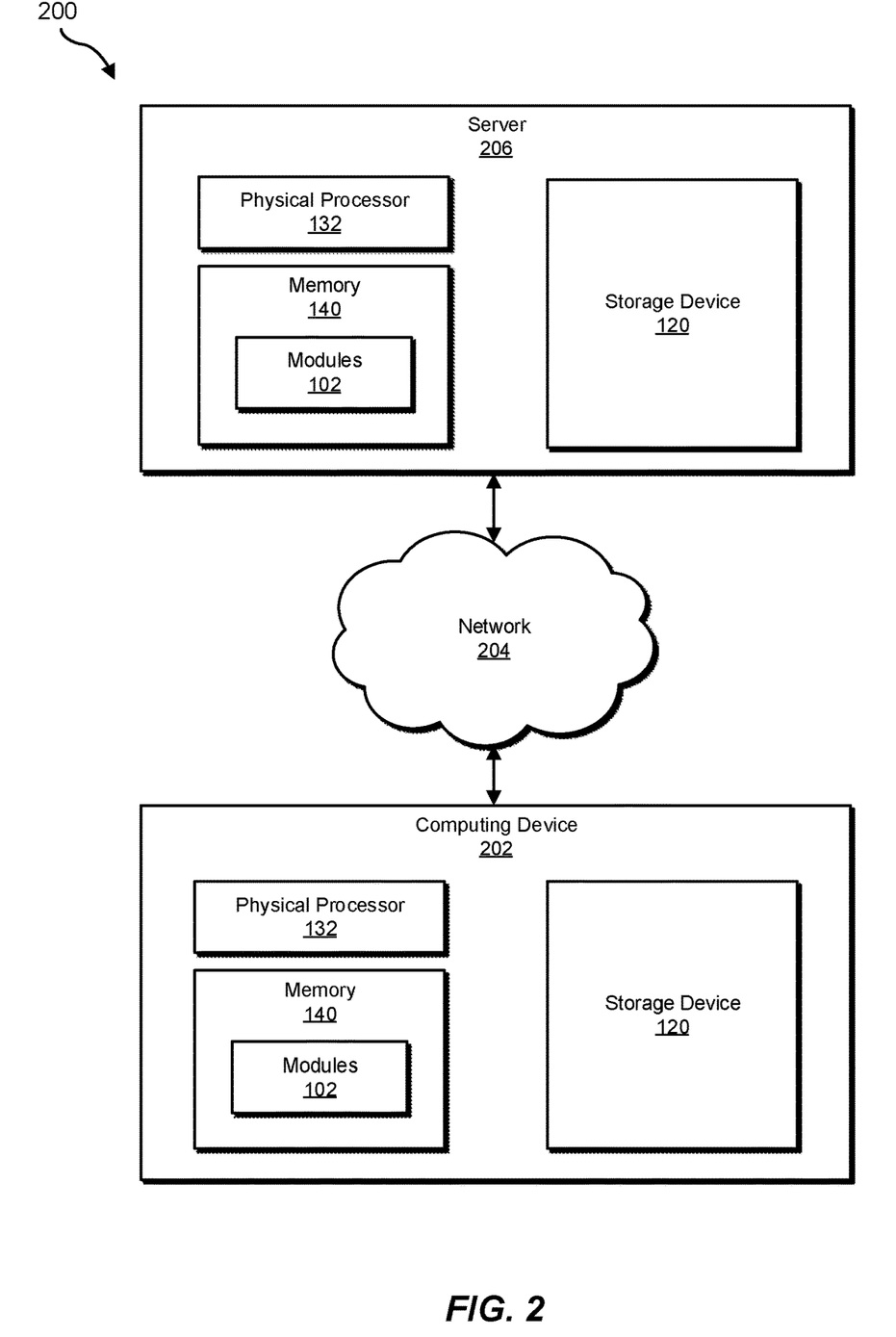
FIG. 2 is a block diagram of an additional example system for detecting geolocation-aware malware.

The following will provide, with reference to FIGS. 1-2, detailed descriptions of example systems for detecting geolocation-aware malware. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 4 and 5, respectively.

FIG. 1 is a block diagram of an example system 100 for detecting geolocation-aware malware. As illustrated in this figure, example system 100 may include one or more modules 102 for performing one or more tasks. As will be explained in greater detail below, modules 102 may include a receiving module 104, an identifying module 106, an establishing module 108, a running module, 110, and an analyzing module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of trajectory information 122, target geolocation characteristic 124, user machine image 126, execution environment 128, and/or geolocation malware 130. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 132. Physical processor 132 generally represents any type or form of hardware-implemented processing unit capable of interpreting and/or executing computer-readable instructions. In one example, physical processor 132 may access and/or modify one or more of modules 102 stored in memory 140. Additionally or alternatively, physical processor 132 may execute one or more of modules 102 to facilitate detecting geolocation-aware malware. Examples of physical processor 132 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect geolocation-aware malware. For example, and as will be described in greater detail below, one or more of modules 102 may cause computing device 202 and/or server 206 to (1) receive, at computing device 202 and/or server 206, trajectory information 122 for network traffic carrying geolocation-aware malware 130, (2) identify, from trajectory information 122, target geolocation characteristic 124 required to activate geolocation-aware malware 130, (3) establish, on user machine image 126, an execution environment having target geolocation characteristic 124, (4) run, on user machine image 126, geolocation-aware malware 130, and (5) analyze functioning of geolocation-aware malware 130 to identify malicious activity by geolocation-aware malware 130.

Computing device 202 generally represents any type or form of computing device capable of reading computer-executable instructions. For example, computing device 202 may represent an endpoint device running client-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), advanced threat protection platforms (ATPS), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that reads computer-executable instructions. For example, server 206 may represent a server running server-side software, such as anti-malware execution software. In examples, server 206 is a part of a cloud computing data center. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
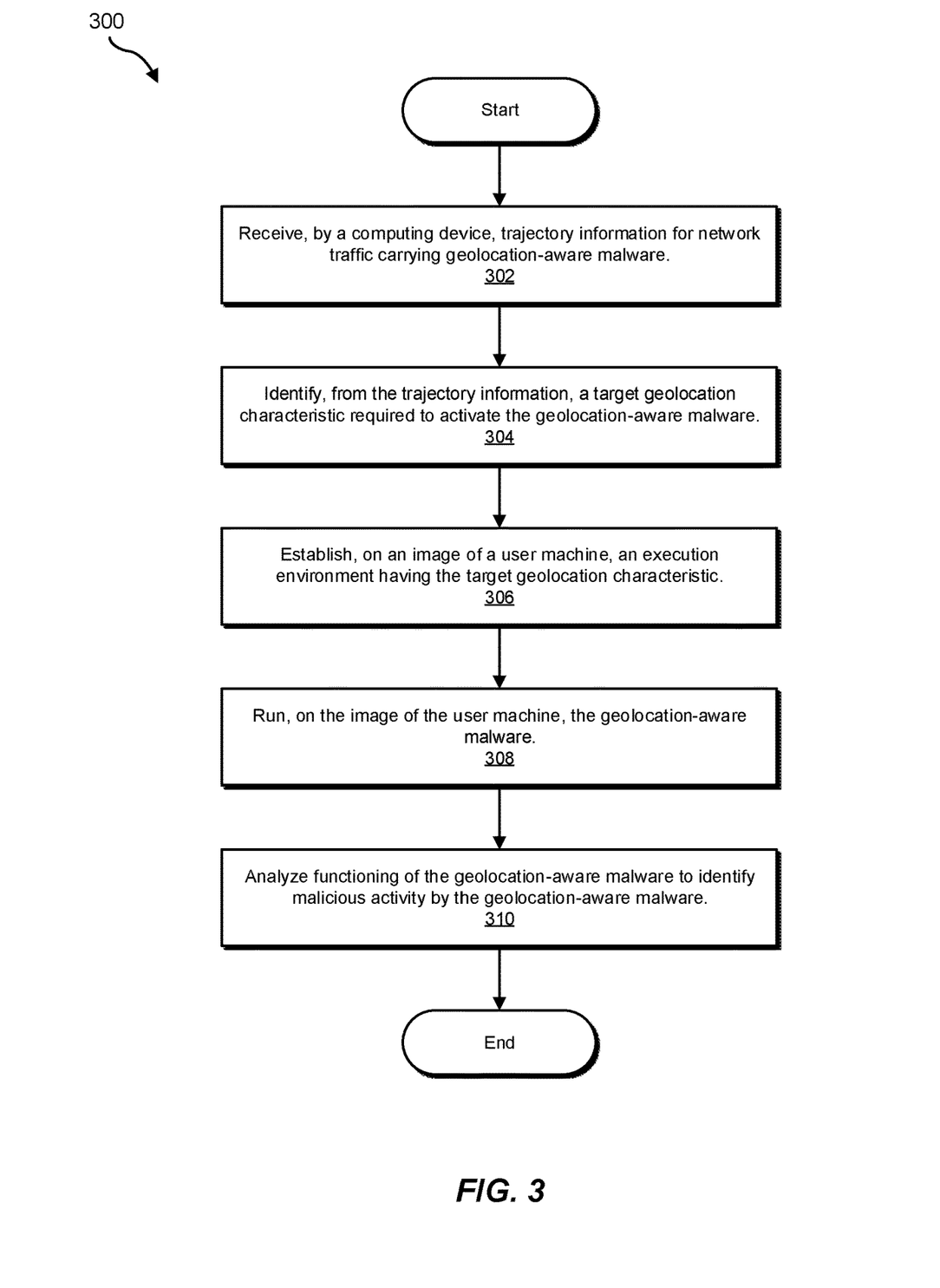
FIG. 3 is a flow diagram of an example method for detecting geolocation-aware malware.

FIG. 3 is a flow diagram of an example computer-implemented method 300 for detecting geolocation-aware malware. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As is described in further detail herein, one or more of the systems described herein may detect geo-location aware malware. For example, modules 102 may, as part of computing device 202 and/or server 206 in FIG. 2, receive trajectory information 122 for network traffic carrying geo-location-aware malware 130; identify, from trajectory information 122, target geolocation characteristic 124 required to activate geolocation-aware malware 130; establish, on user machine image 126, an execution environment having target geolocation characteristic 124; run, on user machine image 126, geolocation-aware malware 130; and analyze functioning of geolocation-aware malware 130 to identify malicious activity by geolocation-aware malware 130.

In some examples, potential security risks associated with the process may be identified and, in response to identifying the potential security risk, security actions may be performed in an attempt to ameliorate potential security risks. For example, analyzing module 112 may identify a potential security risk associated malicious activity by geolocation-aware malware 130 and in response a performing module may perform a security action in an attempt to ameliorate the potential security risk. The security action may include stopping computer-implemented method 300. The security action may also include notifying users of the potential security risk associated with geolocation-aware malware 130 and/or network traffic carrying geolocation-aware malware 130.

As illustrated in FIG. 3, at step 302 one or more of the systems described herein may receive trajectory information for network traffic carrying geolocation-aware malware. For example, receiving module 104, may, as part of computing device 202 and/or server 206 in FIG. 2, receive trajectory information 122 for network traffic carrying geolocation-aware malware 130.

In additional examples, trajectory information 122 is received from advanced threat protection (ATP) platforms, such as computing device 202 in FIG. 2. In some additional embodiments, trajectory information 122 may include at least one of a location of ATP platforms from which trajectory information 122 is received, a source of network traffic, and/or a destination of network traffic. In some examples, trajectory information 122 may be normalized into a target geolocation signature including location, time zone, etc. In examples, trajectory information 122 may include information describing geolocation information about ATP platforms, such as ATP platform configuration settings describing ATP platform hardware, ATP platform software, ATP platform language settings, ATP platform time zones, and/or ATP platform language settings.

In some examples, one or more of the systems described herein may receive, from ATP platforms, information describing at least one of location-specific hardware of a target of the network traffic and/or location-specific software of the target of the network traffic. In examples, receiving trajectory information may include receiving, from ATP platforms, information describing at least one of a language setting of an operating system of a target machine, a keyboard language of the target machine, and/or a time zone of the target machine.

The term "trajectory information," as used herein, generally refers to information describing paths taken and/or intended to be taken by network traffic carrying geolocation-aware malware. In examples, trajectory information may include traffic routing information, traffic source information, and/or traffic destination information (e.g., an email address, an IP address, etc.).

Returning to FIG. 3, at step 304, one or more of systems described herein may identify, from trajectory information, target geolocation characteristics required to activate geolocation-aware malware. For example, identifying module 106, may, as part of computing device 202 and/or server 206 in FIG. 2, identify, from trajectory information 122, target geolocation characteristic 124 required to activate geolocation-aware malware 130.

In additional examples, identifying target geolocation characteristic 124 may include identifying target geolocation characteristic 124 from information describing location-specific hardware of targets of network traffic and/or location-specific software of targets of network traffic. In examples, identifying target geolocation characteristic 124 may include identifying target geolocation characteristic 124 from artifact information describing geo-specific hardware features of target machines. For example, geo-specific hardware features of target machines may include at least one of language settings of operating systems of target machines, keyboard languages of target machines, and/or time zones of target machines.

Returning to FIG. 3, at step 306, one or more of systems described herein may establish, on user machine images, execution environments having target geolocation characteristics. For example, establishing module 108, may, as part of computing device 202 and/or server 206 in FIG. 2, establish, on user machine image 126, execution environment 128 having target geolocation characteristic 124. In examples, execution environments having target geolocation characteristics may enable detecting geolocation-aware malware 130, where execution environments not having target geolocation characteristics (e.g., having a generic environment) would not detect geolocation-aware malware 130. In examples, user machine images may be implemented on virtual machines and/or physical machines.

In additional examples, a server farm may have servers which are arranged to present a specific location to geolocation-aware malware 130. For example, a first server may be arranged to present a first execution environment having characteristics of Brazil to geolocation-aware malware 130, while a second server may be arranged to present a second execution environment having characteristics of Chile to geolocation-aware malware 130.

Returning to FIG. 3, at step 308, one or more of systems described herein may run, on user machine images, geolocation-aware malware. For example, running module 110, may, as part of computing device 202 and/or server 206 in FIG. 2, run, in execution environment 128 on user machine image 126, geolocation-aware malware 130. In examples, geolocation-aware malware 130 may run on multiple instances of execution environment 128, where at least two of the instances present different geolocation information to geolocation-aware malware 130. For example, a first instance may present geolocation information indicating solely a Japanese location of a target machine, while a second instance may present the same geolocation information but substitute geolocation information directed toward a German-language keyboard for geolocation information directed toward a Japanese-language keyboard.

In additional examples, running geolocation-aware malware 130 may further include receiving requests, from geolocation-aware malware 130, for geolocation-related information about target machines. In some additional embodiments, running geolocation-aware malware 130 may further include providing, to geolocation-aware malware 130, falsified network responses indicating geolocation-related information about target machines. For example, when geolocation-aware malware 130 requests geolocation information about a specific internet protocol address of a user machine on which geolocation-aware malware 130 is running, execution environment 128 provides a falsified response that geolocation-aware malware 130 requires to trigger a malware payload, while execution environment 128 is not located in a target geography of geolocation-aware malware 130.

In some examples, running geolocation-aware malware 130 may include receiving requests, from geolocation-aware malware 130, for application program interface (API) responses indicating geolocation-related information. In some additional embodiments, running geolocation-aware malware 130 may include providing, to geolocation-aware malware 130, falsified API responses indicating geolocation-related information. For example, when geolocation-aware malware 130 requests an API response about geography-specific hardware of a user machine on which geolocation-aware malware 130 is running, execution environment 128 provides a falsified response that geolocation-aware malware 130 requires to trigger a malware payload, while execution environment 128 is not located in a target geography of geolocation-aware malware 130.

Returning to FIG. 3, at step 310, one or more of systems described herein may analyze functioning of geolocation-aware malware to identify malicious activity by geolocation-aware malware. For example, analyzing module 112, may, as part of computing device 202 and/or server 206 in FIG. 2, analyze functioning of geolocation-aware malware 130 to identify malicious activity by geolocation-aware malware 130. Thus, computer-implemented method 300 may identify geolocation-aware malware 130 as malicious software that runs only in specific locales.

In some additional embodiments, using identified malicious activity as a basis, computer-implemented method 300 may determine signatures of geolocation-aware malware 130, verdicts that geolocation-aware malware 130 is not safe to run on target machines, and/or reputations of geolocation-aware malware 130. In some examples, computer-implemented method 300 may store signatures, verdicts, and/or reputations, for example, in storage device 120. In additional examples, computer-implemented method 300 may use signatures, verdicts, and/or reputations to identify geolocation-aware malware 130 in network traffic.

As detailed above, the steps outlined in method 300 in FIG. 3 may enable computing devices to automatically detect geolocation-aware malware. For example, the systems described herein may use trajectory information to identify a target geolocation characteristic required to activate the geolocation-aware malware. The geolocation-aware malware may then run on a user machine image that has the target geolocation characteristic in order to trigger malicious activity by the geolocation-aware malware in a controlled environment in which the geolocation-aware malware and the malicious activity may be monitored and analyzed. By doing so, the systems and methods described herein may improve a state of security of target computing devices, potentially resulting in significant time and/or monetary savings.

Figure 4:
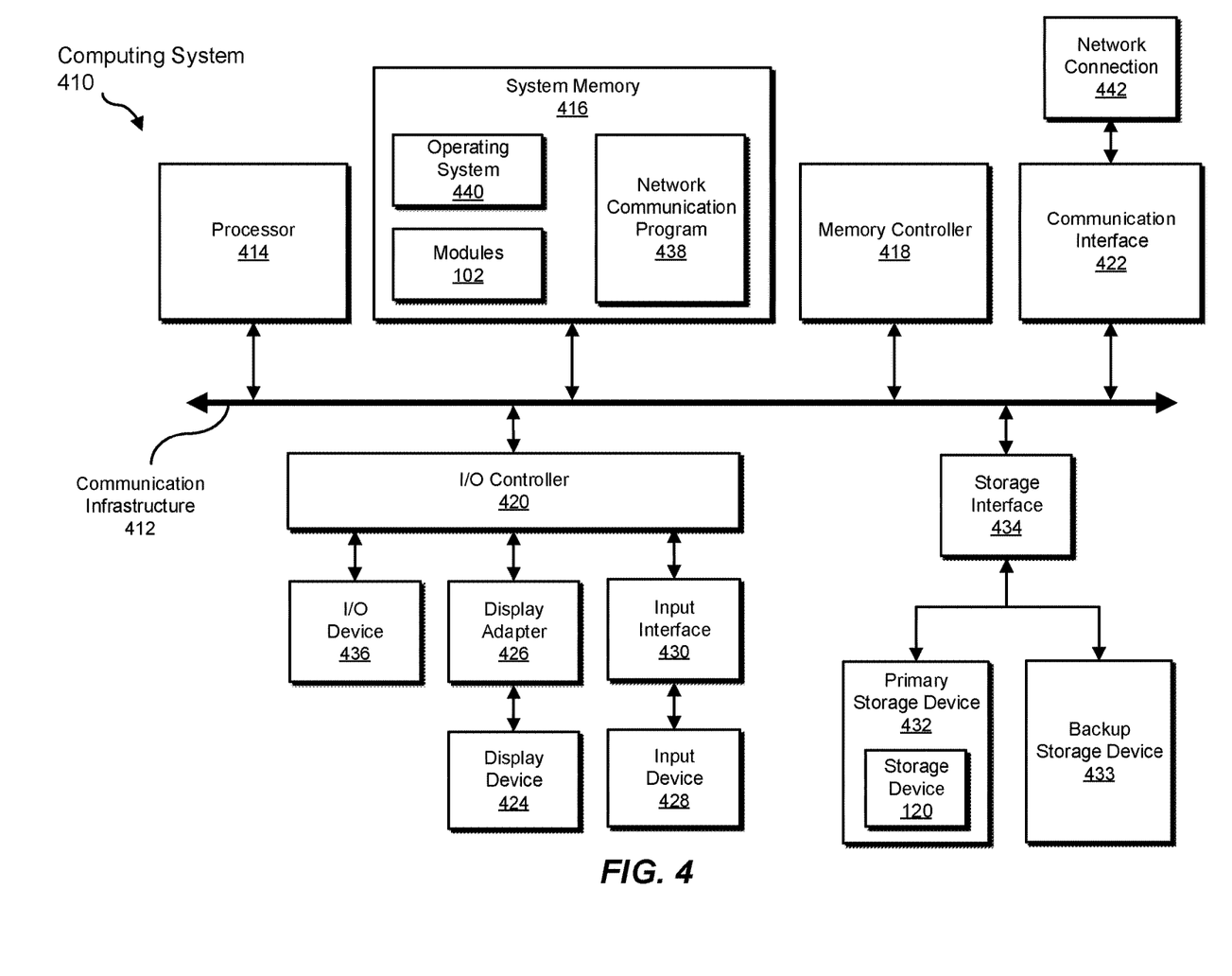
FIG. 4 is a block diagram of an example computing system capable of implementing one or more of the embodiments described and/or illustrated herein.

FIG. 4 is a block diagram of an example computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the example embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In some examples, system memory 416 may store and/or load an operating system 440 for execution by processor 414. In one example, operating system 440 may include and/or represent software that manages computer hardware and software resources and/or provides common services to computer programs and/or applications on computing system 410. Examples of operating system 440 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

As illustrated in FIG. 4, computing system 410 may also include at least one display device 424 coupled to I/O controller 420 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, example computing system 410 may also include at least one input device 428 coupled to I/O controller 420 via an input interface 430. Input device 428 generally represents any type or form of input device capable of providing input, either computer or human generated, to example computing system 410. Examples of input device 428 include, without limitation, a keyboard, a pointing device, a speech recognition device, variations or combinations of one or more of the same, and/or any other input device.

Additionally or alternatively, example computing system 410 may include additional I/O devices. For example, example computing system 410 may include I/O device 436. In this example, I/O device 436 may include and/or represent a user interface that facilitates human interaction with computing system 410. Examples of I/O device 436 include, without limitation, a computer mouse, a keyboard, a monitor, a printer, a modem, a camera, a scanner, a microphone, a touchscreen device, variations or combinations of one or more of the same, and/or any other I/O device.

Communication interface 422 broadly represents any type or form of communication device or adapter capable of facilitating communication between example computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

In some examples, system memory 416 may store and/or load a network communication program 438 for execution by processor 414. In one example, network communication program 438 may include and/or represent software that enables computing system 410 to establish a network connection 442 with another computing system (not illustrated in FIG. 4) and/or communicate with the other computing system by way of communication interface 422. In this example, network communication program 438 may direct the flow of outgoing traffic that is sent to the other computing system via network connection 442. Additionally or alternatively, network communication program 438 may direct the processing of incoming traffic that is received from the other computing system via network connection 442 in connection with processor 414.

Although not illustrated in this way in FIG. 4, network communication program 438 may alternatively be stored and/or loaded in communication interface 422. For example, network communication program 438 may include and/or represent at least a portion of software and/or firmware that is executed by a processor and/or Application Specific Integrated Circuit (ASIC) incorporated in communication interface 422.

As illustrated in FIG. 4, example computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, storage device 120 in FIG. 1 may be at least a part of primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 410 may be configured as an Application Specific Integrated Circuit (ASIC) adapted to implement one or more of the example embodiments disclosed herein.

Figure 5:
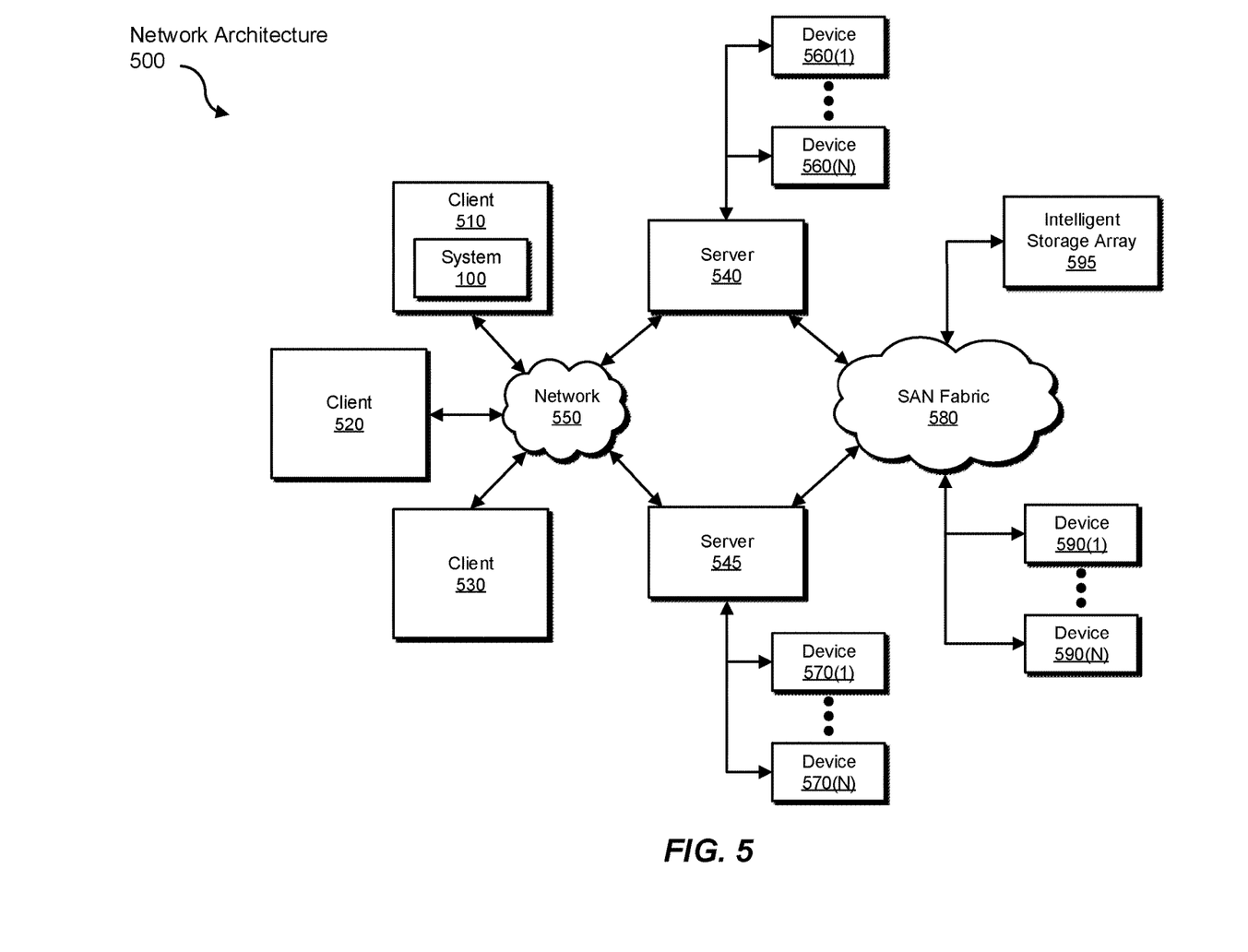
FIG. 5 is a block diagram of an example computing network capable of implementing one or more of the embodiments described and/or illustrated herein.

FIG. 5 is a block diagram of an example network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as example computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to example computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the example embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an example method for detecting geolocation-aware malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive trajectory information to be transformed, transform the trajectory information, output a result of the transformation to a user machine image, use the result of the transformation to identify malicious activity by geolocation-aware malware, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting geolocation-aware malware, at least a portion of the method being performed by a computing device comprising at least one processor, the method comprising:
   receiving, by the computing device, trajectory information for network traffic carrying the geolocation-aware malware, wherein the trajectory information comprises paths intended to be taken by the network traffic carrying the geolocation-aware malware;
   identifying, from the trajectory information, a target geolocation characteristic required to activate the geolocation-aware malware;
   establishing, on an image of a user machine, an execution environment having the target geolocation characteristic;
   running, on the image of the user machine, the geolocation-aware malware; and
   analyzing functioning of the geolocation-aware malware to identify malicious activity by the geolocation-aware malware.

2. The method of claim 1, wherein the trajectory information is received from an advanced threat protection platform.

3. The method of claim 1, wherein the trajectory information includes at least one of:

a location of an advanced threat protection platform from which the trajectory information is received;
a source of the network traffic; and
a destination of the network traffic.

4. The method of claim 1, further comprising:
receiving, from an advanced threat protection platform, information describing at least one of:
location-specific hardware of a target of the network traffic; and
location-specific software of the target of the network traffic; and
identifying the target geolocation characteristic from the information describing at least one of:
the location-specific hardware of the target of the network traffic; and
the location-specific software of the target of the network traffic.

5. The method of claim 1, further comprising:
receiving, from an advanced threat protection platform, information describing at least one of:
a language setting of an operating system of a target machine; and
a keyboard language of the target machine; and
identifying the target geolocation characteristic from the information describing at least one of:
the language setting of the operating system of the target machine; and
the keyboard language of the target machine.

6. The method of claim 1, wherein running the geolocation-aware malware further includes:
receiving a request, from the geolocation-aware malware, for geolocation-related information about a target machine; and
providing, to the geolocation-aware malware, a falsified network response indicating the geolocation-related information about the target machine.

7. The method of claim 1, wherein running the geolocation-aware malware further includes:
receiving a request, from the geolocation-aware malware, for an application program interface (API) response indicating geolocation-related information; and
providing, to the geolocation-aware malware, a falsified API response indicating the geolocation-related information.

8. The method of claim 1, further comprising determining, using the identified malicious activity as a basis, at least one of:
a signature of the geolocation-aware malware;
a verdict that the geolocation-aware malware is not safe to run on a target machine; and
a reputation of the geolocation-aware malware.

9. The method of claim 1, further comprising performing at least one security action in response to identifying malicious activity by the geolocation-aware malware.

10. The method of claim 1, further comprising:
receiving information describing a time zone of the target machine; and
identifying the target geolocation characteristic from the information describing the time zone of the target machine.

11. A system for detecting geolocation-aware malware, the system comprising:
a memory device;
a receiving module, stored in the memory device, that receives trajectory information for network traffic carrying the geolocation-aware malware, wherein the trajectory information comprises paths intended to be taken by the network traffic carrying the geolocation-aware malware;
an identifying module, stored in the memory device, that identifies, from the trajectory information, a target geolocation characteristic required to activate the geolocation-aware malware;
an establishing module, stored in the memory device, that establishes, on an image of a user machine, an execution environment having the target geolocation characteristic;
a running module, stored in the memory device, that runs the geolocation-aware malware on the image of the user machine;
an analyzing module, stored in the memory device, that analyzes functioning of the geolocation-aware malware to identify malicious activity by the geolocation-aware malware; and
at least one physical processor that executes the receiving module, the identifying module, the establishing module, the running module, and the analyzing module.

12. The system of claim 11, wherein the trajectory information is received from an advanced threat protection platform.

13. The system of claim 11, wherein the trajectory information includes at least one of:
a location of an advanced threat protection platform from which the trajectory information is received;
a source of the network traffic; and
a destination of the network traffic.

14. The system of claim 11, wherein the receiving module receives, from an advanced threat protection platform, information describing at least one of:
location-specific hardware of a target of the network traffic; and
location-specific software of the target of the network traffic; and
the identifying module identifies the target geolocation characteristic from the information describing at least one of:
the location-specific hardware of the target of the network traffic; and
the location-specific software of the target of the network traffic.

15. The system of claim 11, wherein the receiving module receives, from an advanced threat protection platform, information describing at least one of:
a language setting of an operating system of a target machine;
a keyboard language of the target machine; and
the identifying module identifies the target geolocation characteristic from the information describing at least one of:
the language setting of the operating system of the target machine; and
the keyboard language of the target machine.

16. The system of claim 11, wherein running the geolocation-aware malware further includes:
receiving a request, from the geolocation-aware malware, for geolocation-related information about a target machine; and
providing, to the geolocation-aware malware, a falsified network response indicating the geolocation-related information about the target machine.

17. The system of claim 11, wherein running the geolocation-aware malware further includes:

receiving a request, from the geolocation-aware malware, for an application program interface (API) response indicating geolocation-related information; and providing, to the geolocation-aware malware, a falsified API response indicating the geolocation-related information.

18. The system of claim 11, further comprising a determining module, stored in the memory device, that determines, using the identified malicious activity as a basis, at least one of:
- a signature of the geolocation-aware malware;
- a verdict that the geolocation-aware malware is not safe to run on a target machine; and
- a reputation of the geolocation-aware malware.

19. The system of claim 11, further comprising a performing module, stored in the memory device, that performs at least one security action in response to identifying malicious activity by the geolocation-aware malware.

20. A non-transitory computer-readable medium comprising one or more computer-executable instructions that, when executed by at least one processor of a computing device, cause the computing device to:

receive trajectory information for network traffic carrying geolocation-aware malware, wherein the trajectory information comprises paths intended to be taken by the network traffic carrying the geolocation-aware malware;

identify, from the trajectory information, a target geolocation characteristic required to activate the geolocation-aware malware;

establish, on an image of a user machine, an execution environment having the target geolocation characteristic;

run, on the image of the user machine, the geolocation-aware malware; and analyze functioning of the geolocation-aware malware to identify malicious activity by the geolocation-aware malware.

21. The non-transitory computer-readable medium of claim 20, wherein the trajectory information includes at least one of:
- a location of an advanced threat protection platform from which the trajectory information is received;
- a source of the network traffic; and
- a destination of the network traffic.

* * * * *